2 Sheets--Sheet 2.

G. H. BLISS.
Broiler.

No. 161,856.

Patented April 13, 1875.

WITNESSES.
Wm P. Edwards
E. A. Hemmenway.

INVENTOR.
George H. Bliss.

UNITED STATES PATENT OFFICE.

GEORGE H. BLISS, OF WEST STOCKBRIDGE, MASSACHUSETTS.

IMPROVEMENT IN BROILERS.

Specification forming part of Letters Patent No. 161,856, dated April 13, 1875; application filed February 10, 1875.

*To all whom it may concern:*

Be it known that I, GEORGE H. BLISS, of West Stockbridge, in the county of Berkshire and State of Massachusetts, have invented a new and useful Culinary Apparatus, of which the following, taken in connection with the accompanying drawings, is a specification:

My invention relates to a vessel or apparatus to be used upon a cooking stove or range for the purpose of broiling steaks and cooking various other kinds of food; and it consists in the use of a vessel having an open bottom, and the top provided with a removable cover, and containing, in an upright position, a removable folding gridiron or open-work cage or holder, into which the meat or other article to be cooked is placed.

My invention further consists in providing said vessel with an inclined spout, extending across said vessel near its bottom, and protruding through the side of said vessel at its lowest end, said spout serving the double purpose of a support for the gridiron and a drip-trough to catch and convey away the fat which tries out of the meat.

My invention further consists in making said drip-trough or spout detachable, so as to be readily cleaned, and supporting it upon the upper edges of two vertical side flanges or ribs of a cross-girder, extending from side to side of said vessel, in combination with two openings in the side walls of said vessel, just opposite the ends of said girder, all so arranged as to form a hollow tube extending across said vessel, directly beneath the drip-trough, through which air circulates freely, and thus prevents the fat in the drip-pan from being burned.

My invention further consists in the use, in combination with said vessel, its drip-trough, and gridiron or food-holder, of a vessel suspended upon the projecting end of the drip-trough to catch the fat which flows therefrom.

Figure 1:
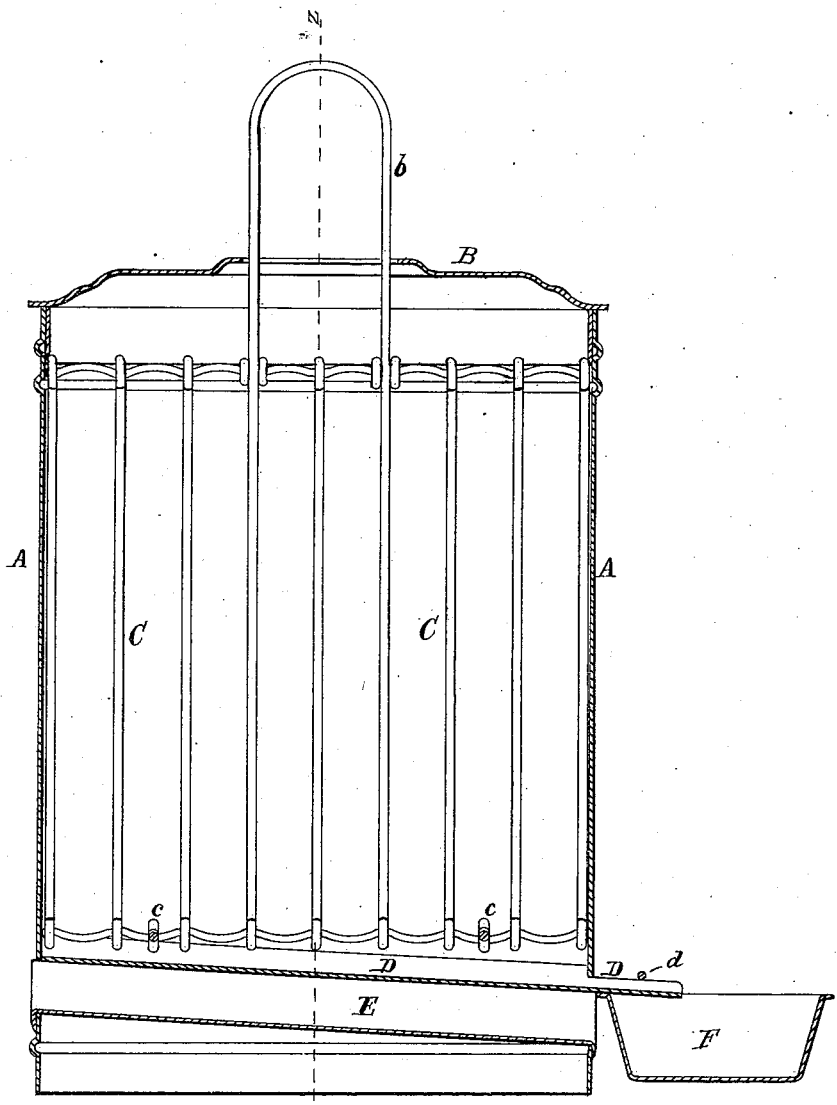
Figure 2:
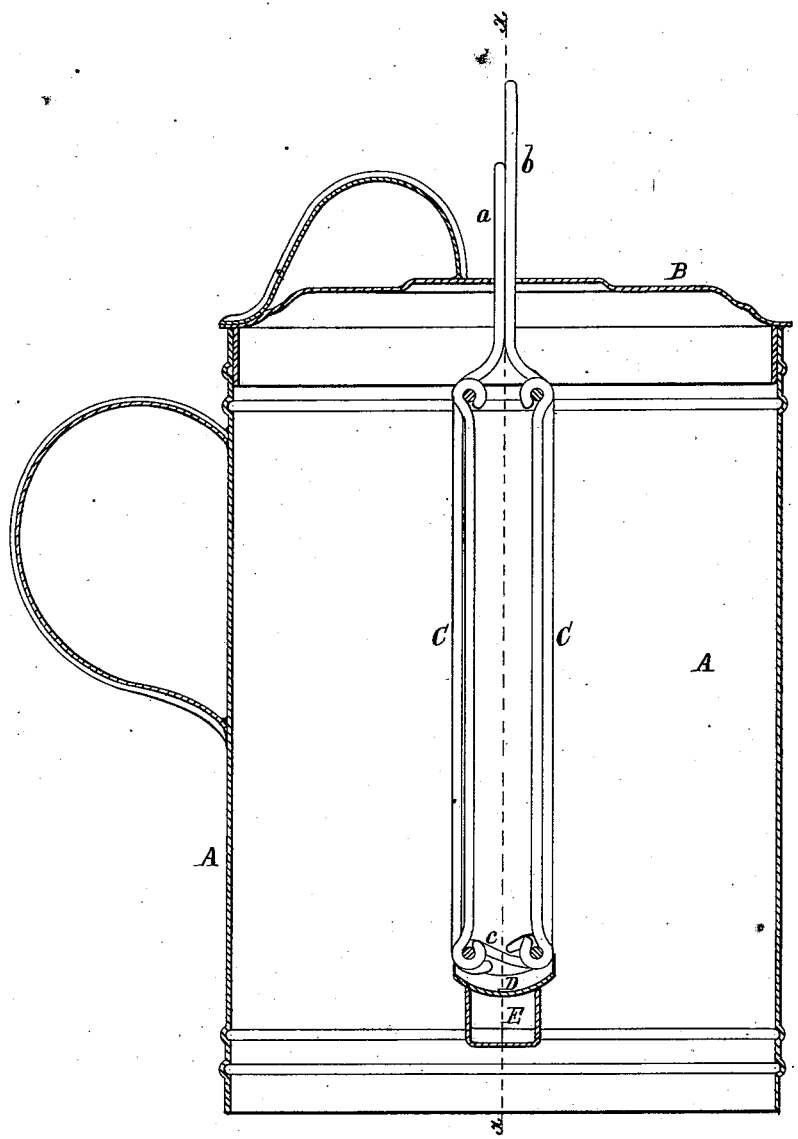

In the drawings, Figure 1 is a vertical section on line $x\ x$ on Fig. 2, and Fig. 2 is a vertical section on line $z\ z$ on Fig. 1.

A is a vessel, open at both ends, made circular, oval, square, or oblong, according to the place it is to be used or the work to be done thereby. This vessel is to be used by placing it over an opening in a stove or range, directly over the fire, and has fitted to its upper end the cover B, in which is formed a slot through which protrudes the handles $a\ b$ of the folding skeleton gridiron C. The gridiron C is constructed in a well-known manner of two skeleton leaves hinged together at their lower ends by the short links $c$, which may be of variable lengths adapted to the special object to be held between the leaves, and provided with the handles $a\ b$. The gridiron or food-holder C is placed in the vessel A, in perpendicular position, as shown, with the steak or other food placed between its leaves, in which position it is held by the curve of the side wall of said vessel in the case of a circular vessel, but in case of a square, oblong, or oval vessel, vertical grooves would be formed in the inside of said vessel by securing thereto vertical projecting ribs for the purpose. The lower end of the gridiron or food-holder C rests upon the shallow inclined trough or spout D, which, though detachably connected thereto, forms the upper side of a tube, E, which passes entirely through said vessel from side to side, so that the air can circulate freely through the same and thus keep the trough or spout D sufficiently cool to prevent the fat which falls therein from the meat contained in the holder from being burned. The bottom and sides of the tube E are attached permanently to the vessel A, and form a girder placed near the bottom of the vessel, as shown in Fig. 1. The trough or spout D projects through the wall of the vessel and has suspended thereon, by the bail-wire $d$, the drip-pan F, into which the fat falls as it descends the spout D, in an obvious manner.

For hotels, restaurants, and boarding-houses, where large quantities of steak are required, the vessel would be made of about the size and form of a common wash-boiler, and a series of gridirons placed therein, in a vertical position, side by side, transversely of the vessel, so that a large number of steaks may be cooked at the same time, a proper opening being made in the stove or range, by removing a sufficient number of covers.

The operation of my invention is as follows: The steak or other article to be cooked is placed upon one leaf of the gridiron, and the other leaf is then laid over upon the meat or other article, when the whole is lifted by the handles *a b* into a perpendicular position and dropped endwise into its position in the vessel A, till its lower end rests upon the trough D. The cover B is now placed over the top of the vessel so as to close it up, except the slot in said cover, through which the handles *a b* project, and the drip-pan F is suspended upon the end of the spout D, as shown in Fig. 1, when the vessel is placed directly over an open hole in the top of a stove or range, with a good fire of hot coals directly beneath, in which position it remains without further attention until the steak or other article is cooked, which, in the case of a steak, will be in from four to six minutes, and the steak will be removed from the vessel without being burnt or scorched, and retaining all its juices, which is very often not the case when steak is broiled over a bed of coals in a flat position, as heretofore practiced.

In the use of my invention, the steak or other article requires no turning or watching to prevent it from burning, and as the fat is all caught in the trough and conveyed into the drip-pan, outside, instead of falling upon the coals, as formerly, the fire is not deadened, and the process of broiling may be continued indefinitely and a good fire be maintained.

Beside the broiling of steak, this apparatus may be used to advantage for broiling fish, or fish may be baked whole or in pieces; potatoes may be baked and various other kinds of food may be baked or roasted, it only being necessary to adapt the folding gridiron or food-holder to the article to be cooked. The apparatus may be made entirely of sheet or cast iron, or the base may be made of cast-iron and the upper portion of sheet-iron, as may be desired.

What I claim as new, and desire to secure by Letters Patent of the United States, is as follows:

1. In a culinary apparatus for broiling steaks and cooking other articles, the combination of the vessel A, closed at the top by a suitable cover, and open at the bottom, and adapted to be used upon the top of a stove or range, by being placed over an opening therein, directly over the fire, and a double-leaved folding gridiron or skeleton food-holder C supported vertically therein, in a position to admit of a free and equal access of the heat from the fire to both sides thereof, to cook both sides of the food contained therein, without turning, substantially as described.

2. In combination with the bottomless vessel A, adapted to be used upon the top of a stove or range, by placing it over an opening therein, directly over the fire, and the gridiron or food-holder C, supported vertically therein, as set forth, the trough or spout D provided with the air-tube or space E beneath it, substantially as described.

3. In combination with the bottomless vessel or casing A, adapted to use upon the top of a stove or range, by placing it over an opening therein, directly over the fire, as set forth, and the gridiron or food-holder C, supported vertically therein, in position to admit of a free and equal access of the heat of the fire to both sides thereof, the detachable trough or spout D arranged to form the upper side or cover of the air-passage E, substantially as described.

4. The combination of the bottomless vessel or casing A, adapted to use upon the top of a stove or range, as set forth, the double-leaved gridiron or skeleton food-holder C, supdorted vertically therein, the inclined trough or spout D, projecting through the side of the casing A, and the detachable drip-pan F, suspended from said projecting spout, substantially as described.

Executed at Boston, Massachusetts, this 4th day of February, 1875.

GEORGE H. BLISS.

Witnesses:
WM. P. EDWARDS,
E. A. HEMMENWAY.